United States Patent [19]

Hirayama et al.

[11] 4,053,898
[45] Oct. 11, 1977

[54] LASER RECORDING PROCESS

[75] Inventors: Kazuhiro Hirayama, Yokohama; Yasushi Sato, Kawasaki; Taisuke Tokiwa, Yokohama; Kazuo Kawakubo, Hino; Fujio Iwatate, Tokyo; Hisashi Nakatsui, Kawasaki, all of Japan

[73] Assignee: Canon Kabushiki Kaisha, Tokyo, Japan

[21] Appl. No.: 610,082

[22] Filed: Sept. 3, 1975

Related U.S. Application Data

[63] Continuation-in-part of Ser. No. 607,503, Aug. 25, 1975, Ser. No. 607,504, Aug. 25, 1975, and Ser. No. 594,126, July 8, 1975.

[30] Foreign Application Priority Data

Sept. 13, 1974  Japan ............................ 49-105632

[51] Int. Cl.² ......................................... G06K 15/12
[52] U.S. Cl. ...................................... 346/1; 346/108; 354/5; 350/161 W
[58] Field of Search .................. 346/1, 108; 354/5, 7; 350/161 W, 6, 7; 358/61, 62, 63

[56] References Cited

U.S. PATENT DOCUMENTS

| 2,513,520 | 7/1950 | Rosenthal | 358/63 |
| 3,721,756 | 3/1973 | Baker | 350/161 W |
| 3,721,991 | 3/1973 | Kaufman et al. | 346/108 |
| 3,744,039 | 7/1973 | Hrbek et al. | 340/173 LM |

Primary Examiner—Joseph W. Hartary
Attorney, Agent, or Firm—Fitzpatrick, Cella, Harper & Scinto

[57] ABSTRACT

A laser recording method including: deflecting a plurality of laser beams, respectively and dividing the respective beams into multiple beams which are at substantially regular intervals; linearly arranging respective beams of the multiple beams in a line at substantially regular intervals and in a direction perpendicular to a direction of scanning action of the beams on the recording medium; modulating each beam and focusing the beam on the recording medium; and scanning the recording medium with the divided beams.

17 Claims, 6 Drawing Figures

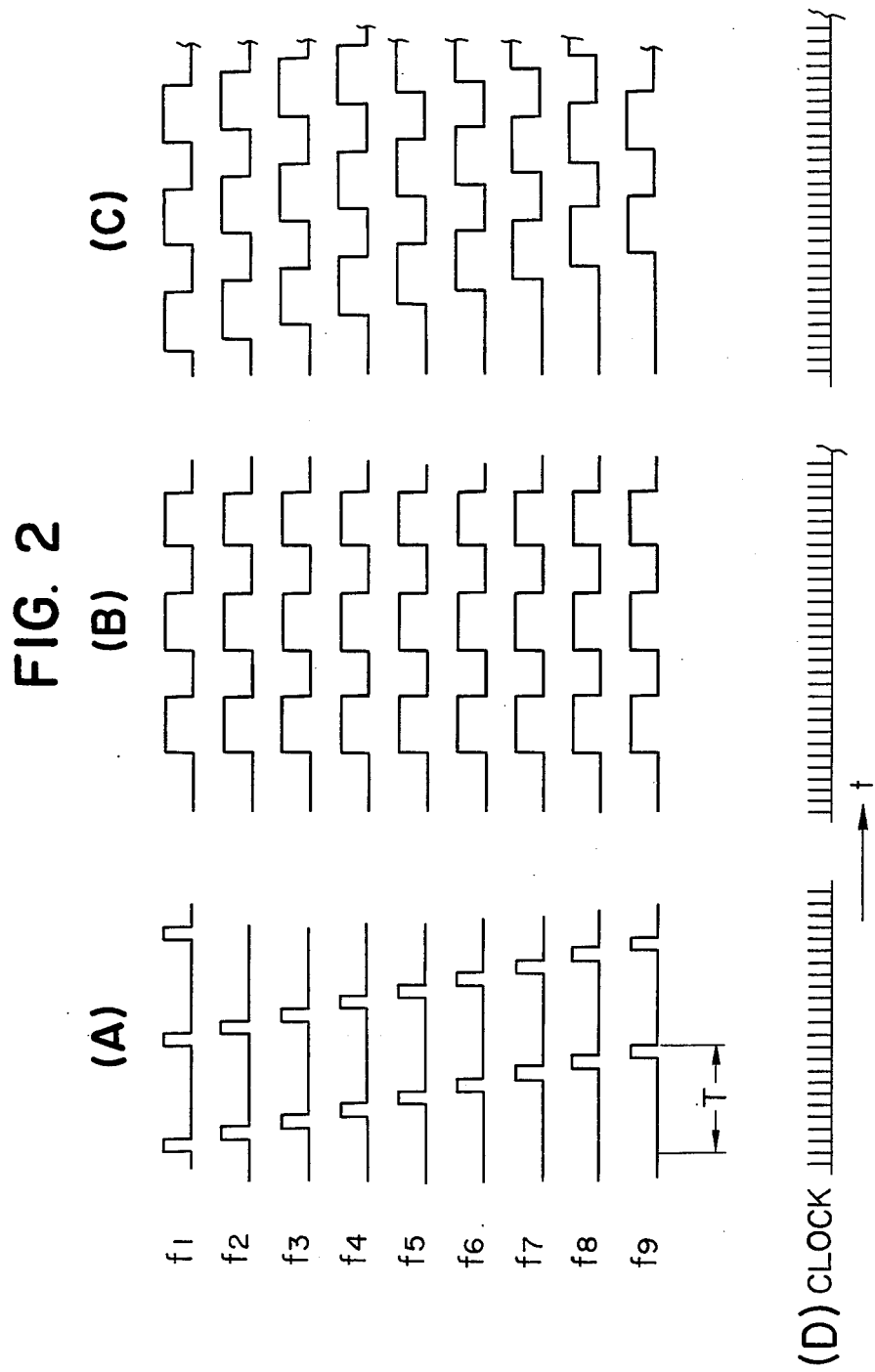

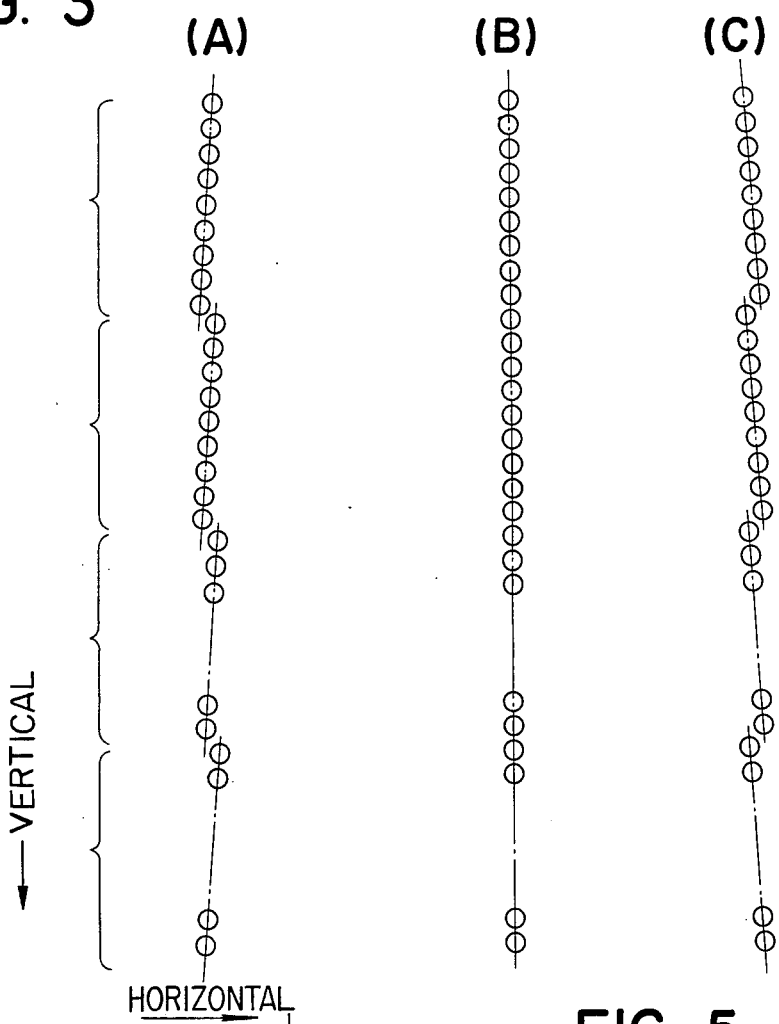
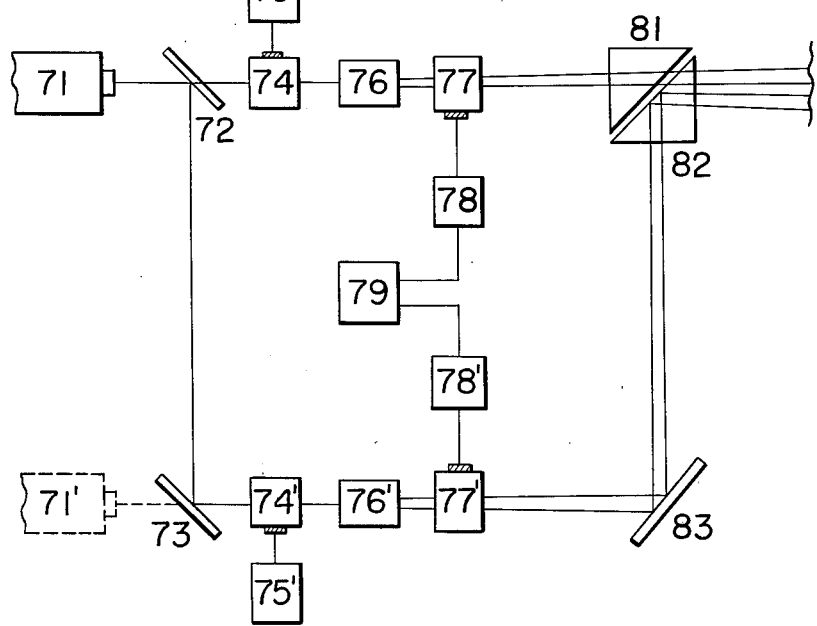

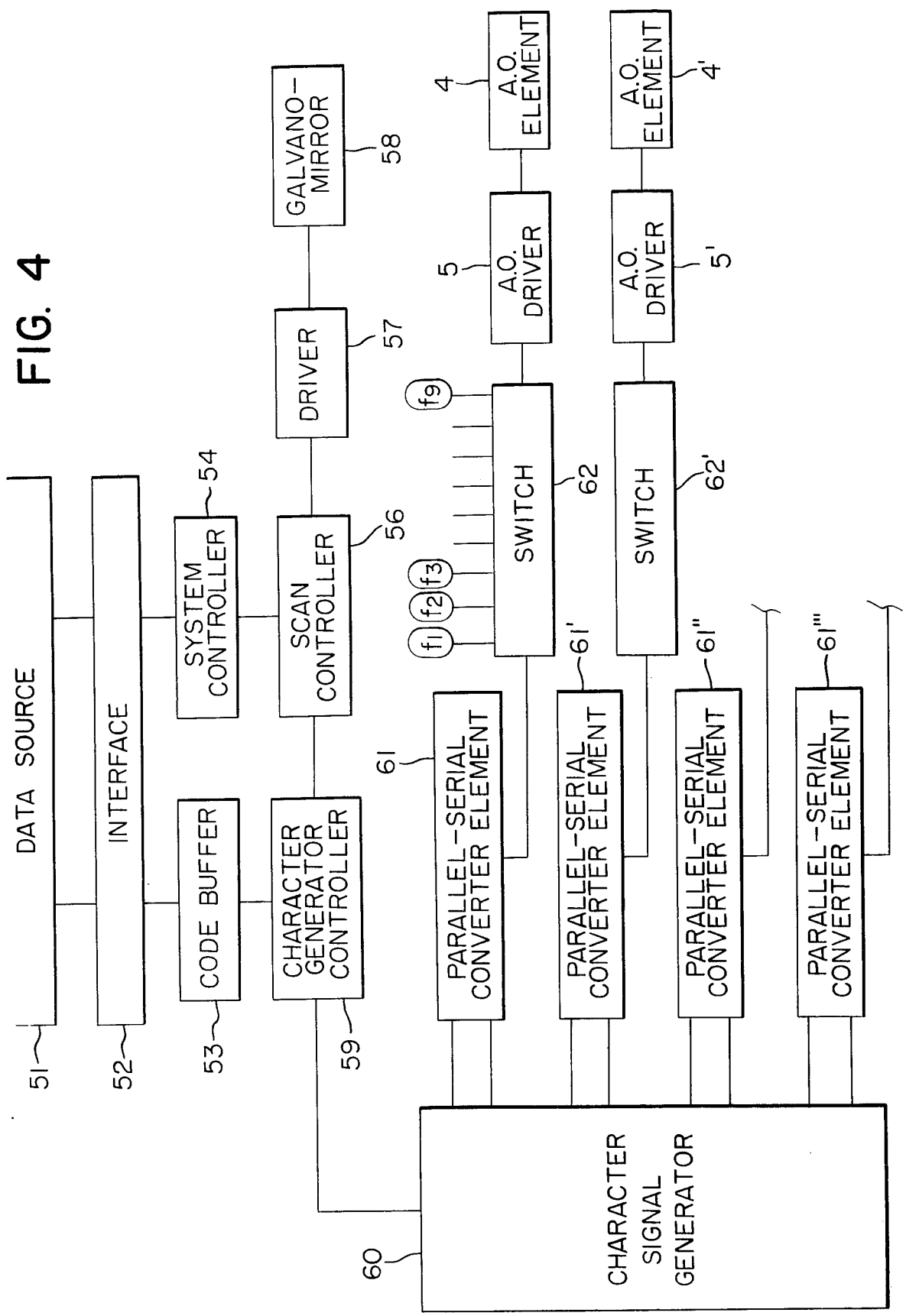

FIG. 6
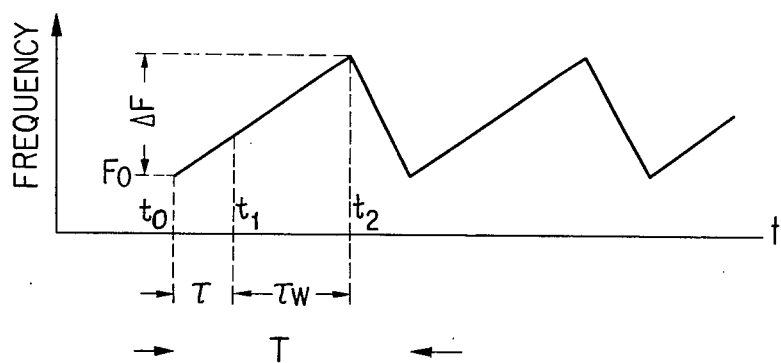
(A)
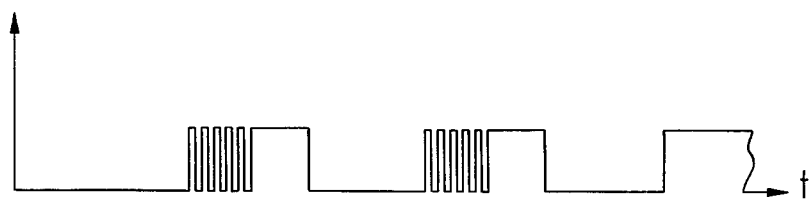
(B)
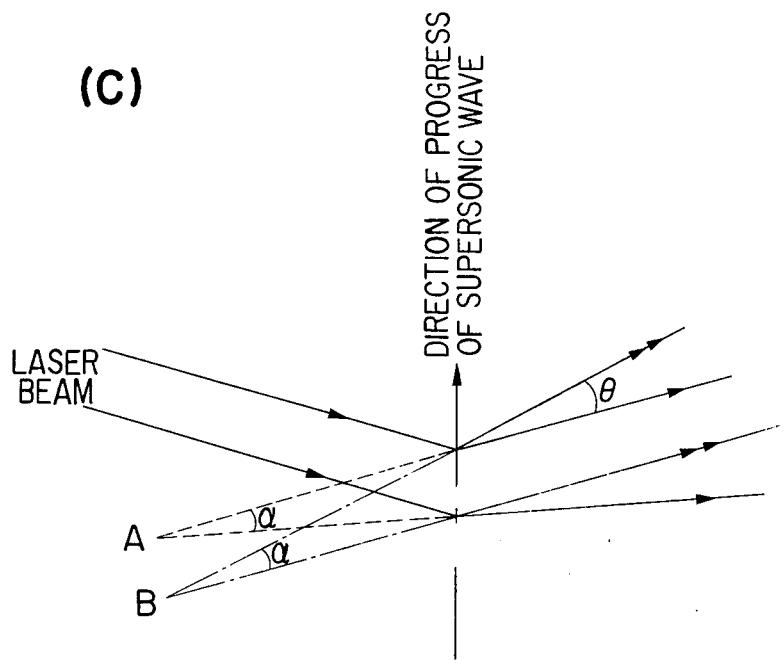
(C)

LASER RECORDING PROCESS

This is a continuation-in-part of application Ser. No. 607,503, filed Aug. 25, 1975; application Ser. No. 607,504, filed Aug. 25, 1975 and application Ser. No. 594,126, filed July 8, 1975.

BACKGROUND OF THE INVENTION

The present invention relates to a laser recording process of high speed and high speed resolving power comprising deflecting a laser beam to a slight extent and dividing it into multi-beams, arranging said multi-beams with equal intervals in the direction of right angle with respect to the direction of the main deflection, and subjecting said multi-beams to the main deflection while modulating them.

In the process for laser recording of patterns such as Roman letters or numerals disclosed by Applicants in copending Application Ser. No. 594,126, filed July 8, 1975, the laser beam is slightly deflected in the direction of the height of the letters in case of lateral writing, by a deflection means such as an acoustic-optical element (hereinafter referred to as AO element) to produce seven to nine beam spots, which are then modulated, scanned and recorded. If in this case, for example, nine ultrasonic waves having different wave lengths are modulated by use of a letter pattern signal and then fed into an AO element successively, the nine kinds of ultrasonic waves resulting in the AO element form nine phase lattices, which allow the laser beam to be deflected in nine different directions successively. Subsequently, images are formed on a laser recording medium by an optical means. As a result, there are obtained nine laser spots which are arranged in the vertical direction.

If one wishes to effect a scanning by the above mentioned process, it is possible to elevate the scanning frequency to several hundred KHz so far as the number of resolution points is at most 7 to 9. However, it is generally true that an increased number of resolution points reduces the speed of scanning, so that for Chinese characters where the number of resolution points is as large as 32 or more, the scanning speed becomes impractically low. This is the disadvantage of this process as compared with other processes, for example, use of a cathode ray tube.

Nevertheless, the laser recording process is suitable for recording complicated patterns such as Chinese which requires a high resolving power, because the spot diameter of the formed image can be reduced in the laser recording process. It is intended in the present invention to utilize the above-mentioned merits of a laser recording process, namely the high resolving power, to realize a recording process of high speed as compared with the hitherto known process, and thereby to provide a high speed laser recording process which can compete with other recording processes.

SUMMARY OF THE INVENTION

The present invention provides a laser recording process of high speed and high resolving power in which there are provided (a) plurality of means for dividing a laser beam into multi-beams separated from one another by intervals of a given angle in accordance with the intended purpose, and (b) an optical means so that the beams sent from the above-mentioned beam-dividing means can form beam spots on the laser recording medium nearly in a line, with equal intervals, and so as to project at nearly right angles with the scanning direction, and each of the beams is modulated. This is an epoch-making and novel laser recording process which enables laser-recording of complicated patterns, such as Chinese characters, for the first time.

BRIEF DESCRIPTION OF THE DRAWINGS

FIG. 2 illustrates the shapes of various waves which are fed into the AO element for the purpose of deflecting a laser beam.

FIG. 3 illustrates the beam spots formed on the same laser recording medium as above.

FIG. 4 illustrates a schematic view which shows the function of the same example as above.

FIG. 5 illustrates a portion of another example of the invention.

FIG. 6 illustrates the wave shape which is fed into the AO element for deflecting the said laser beam and the principle by which a laser beam is deflected.

DESCRIPTION OF THE PREFERRED EMBODIMENTS

Figure 1:
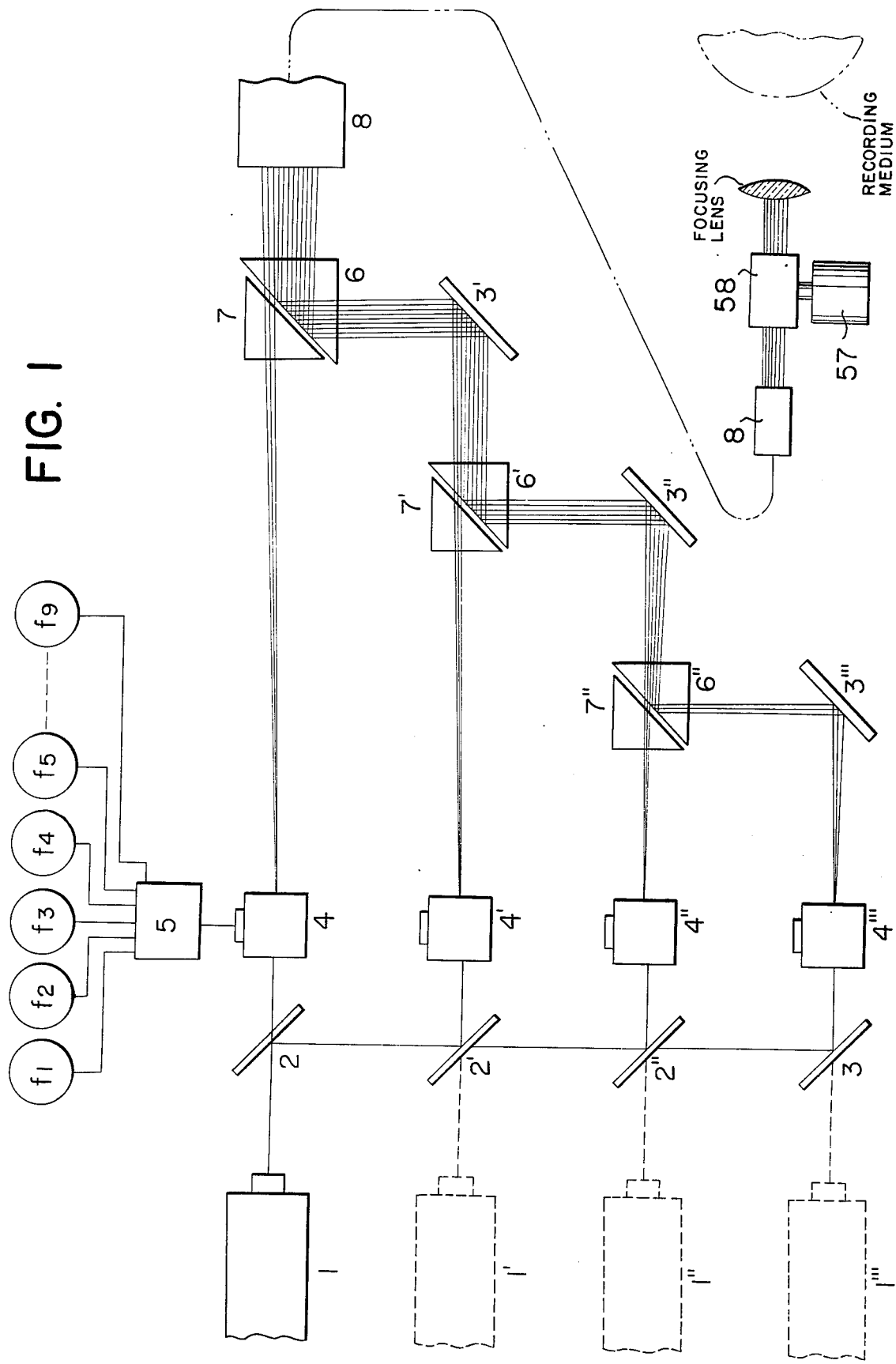
FIG. 1 illustrates a portion of one Example of the invention.

Referring to Examples, the invention will be illustrated below in detail.

EXAMPLE 1

FIG. 1 illustrates the means for scanning in the direction of the height of letters. The laser beam emitted from the oscillator 1 is divided into four laser beams having nearly equal light intensity by the action of the beam-splitters 2, 2', 2'' and the reflecting mirror 3, and which enter respective micro-deflection means, for example acoustic-optical deflection-modulation element (hereinafter referred to as AO element) (4, 4', 4'', 4'''). The AO elements 4, 4', 4'' and 4''' are independently connected with their respective AO driver 5, 5', 5'' and 5''' where 5', 5'' and 5''' are not shown. Each of the AO drivers 5, 5', 5'' and 5''' is connected with high frequency oscillators $f_1$ to $f_9$ which frequencies are separated with nearly equal intervals. The high frequency outputs of $f_1$ to $f_9$ are pulse-modulated and fed into AO element 4 through AO driver 5 successively, whereby an acoustic wave such as an ultrasonic wave corresponding to the frequency of the fed high frequency wave progresses into AO element 4 (the reflection of ultrasonic wave is prevented with an absorbing board provided on the side of the AO element opposite to the transducer) to form nine phase lattices having different pitches successively. The laser beam entering the AO element 4 is diffracted by these phase lattices so that there is obtained one diffracted laser beam for each phase lattices so far as the conditions of Bragg reflection are fulfilled. As a result, if one laser beam enters the AO element 4 it can be deflected into nine directions successively, said nine directions being separated from one another by intervals of nearly equal angle (for convenience, only three directions are shown in the figure). Similarly, elements 4', 4'' and 4''' also deflect the laser beam into nine directions.

Next, a method by which such a laser beam is divided and arranged so as to form a Chinese character pattern of 36 dots in one vertical line will be mentioned below. In FIG. 1, numerals 6, 6' and 6'' are prisms (preferably right angular prisms) with which the projected laser beam is totally reflected along their oblique planes, while 7, 7' and 7" are prisms which are combined with 6, 6' and 6", respectively, so as to maintain the direction of the incident laser beam coming from the left side of the figure constant.

That is to say, the incidence surfaces of prisms 7, 7' and 7" are kept parallel with the emission surfaces of the prisms 6, 6' and 6" (when 6, 6' and 6" are rectangular prisms, 7, 7' and 7" are also rectangular prisms).

At first, the laser beam is deflected by the element 4 into nine directions along the vertical line of the letters, which then passes through the prisms 7 and 6 to reach the beam expander 8 without altering its direction. On the other hand, a laser beam which has been deflected vertically by the AO element 4' similarly passes through the prisms 7' and 6' and then reflected by the mirror 3' to enter prism 6 where it is totally reflected on the oblique plane to go to beam expander 8. The reflecting mirror 3' is adjusted so as to give eighteen laser beams in the total, which are separated from one another by intervals of nearly equal angles; where nine of the eighteen laser beams are derived from the AO element 4 while the remaining nine laser beams are derived from the AO element 4'.

Just in the same manner as above, the laser beams coming from AO elements 4" and 4''' are also arranged so that thirty six laser beams in the total, separated from one another with intervals of equal angle, are obtained.

As is understandable from the above description, the use of sets of prisms is desirable in arranging laser beams because it prevents a loss in light intensity to a remarkable extent as compared with the case when a beam splitter is used. This system is particularly suitable for high speed recording. Although in FIG. 1 there is a certain distance between the point at which the laser beams emitted from AO element 4' (4", 4''') are reflected on the prism 6 (6', 6") and the point at which the laser beams emitted from AO element 4 (4', 4") are reflected on the same prism, it is preferable that the paths of the beams overlap one another from the view point of adjusting the image-forming lens so far as there are angle differences between the paths. When these beams are formed into an image by use of an optical system, there are obtained thirty six light spots vertically arranged during a time period T. If high frequency pulses corresponding to these light spots are subjected to an on-off treatment in accordance with one vertical line in a Chinese character pattern as mentioned later and then an image is formed from these pulses by use of an image-forming optical system on a recording medium a photosensitive drum which is an invention of the present applicants and is set forth in Japanese Patent Publication No. 23910/1967 corresponding to U.S. Pat. No. 3,666,363, one scanning run of a Galvano mirror produces an exposure of the rotating photosensitive drum which corresponds to one vertical line of the Chinese character, where the resolving power of the light corresponds to thirty six dots in the vertical direction. This light can be converted into Chinese character print on a conventional paper immediately according to the electrophotographic process disclosed in Japanese Patent publication No. 23910/1967 corresponding to U.S. Pat. No. 3,666,363. It is preferred in this case to expand the diameter of the laser beam by use of the beam-expander 8 and thereby to ensure the necessary resolving power.

The direction of the above-mentioned thirty six laser beams emitted may be arranged so as to make a certain angle with the paper surface of FIG. 1 in order to form the image spots shown in FIG. 3(A), for example by inclining one set of prisms 6 and 7 slightly around the light path from AO element 4 to beam expander 8 (the same holds also to the set 6' and 7' or the set 6" and 7"). If spots are arranged as shown in FIG. 3(B), on the contrary, the recorded vertical line is apt to be constructed as an oblique line as shown in FIG. 3(C) due to horizontal scanning movement, which leads to a reduction of the quality of the image. The above-mentioned inclination procedure is for the purpose of preventing such undesirable phenomenon.

The same effect as described above is also obtainable by inclining the AO element 4', 4", 4''' or the reflecting mirror 3', 3", 3'''.

The diameters of the laser beams fed into AO elements 4, 4', 4" and 4''' are reduced by inversely employing the beam expander in order to elevate the scanning frequency in the vertical direction so far as the necessary number of resolution points (it is 9 in this example) is obtained.

In the above-mentioned procedure, the laser beam emitted from a single oscillator 1 was divided into four beams by use of beam splitters 2, 2', 2" and mirror 3. Alternatively, however, it is also possible to obtain the same effect by providing a plurality of oscillators 1', 1", 1''' in addition to the oscillator 1 and omitting 2, 2', 2" and 3 as shown by the dotted lines in FIG. 1. Since the laser oscillators 1, 1', 1" and 1''' may be round shaped lasers placed in a strong and cheap metallic case, the laser oscillators and the AO elements can be formed into a cylindrical unit. The spots of FIG. 3(A) can be obtained by rotating and setting up the unit. The unit facilitates control provides a secure system and makes for a flexible system.

FIG. 4 illustrates one embodiment of the laser recording process of the invention by a block diagram. According to the instructions given by system controller 54, a letter code information signal fed from data source 51, such as an electronic computer or a magnetic tape, is sent via interface 52 into letter code buffer 53 where it is memorized. According to the instructions given by system controller 54, scan controller 56 rotates a Galvano mirror 58 through a Galvano mirror driver 57 for vertical scan (this rotation is synchronized with the high frequency pulse which is modulated by the letter pattern signal mentioned later and then fed into AO driver). Character generator controller 59 reads out a letter code from the code buffer 53 according to the signal from scan controller 56, appoints the address of letter signal generator 60, divides the 36 point pattern of the first column of the letter pattern memorized in the appointed position into four parallel positions (each signal involves nine points), and sends the signals to the parallel-serial conversion element 61, 61', 61" and 61'''. The parallel-serial conversion elements 61, 61', 61" and 61''' send the nine point signals received in parallel to the switches 62, 62', 62" and 62''' according to the clock signal shown in FIG. 2(d). Each of the switches is connected with a high frequency oscillator which generates high frequency waves $f_1$ to $f_9$ which frequencies are separated from one another by given constant intervals. The high frequency outputs $f_1$ to $f_9$ are successively modulated into pulses according to the above-mentioned nine point pattern signal as shown in FIG. 2(A), are amplified by the AO driver 5, and enter the AO elements 4, 4', 4" and 4'''. As a result, as has been mentioned afore, there takes place an exposure to yield 36 points per one vertical line. The exposures corresponding to the second to the 36th vertical lines proceed just in the same manner as in the first vertical line, successively. Thereafter the second character is treated in the same manner, which is followed by the third one, and so on.

In this example the number of resolution points in the vertical direction is as large as 36. Nevertheless the frequencies can all be relatively high, because the 36 points are scanned by four AO elements combined together instead of only one AO element. This enables realization of a high resolution and a high speed simultaneously.

EXAMPLE 2

In Example 1 the high frequency pulse signals were fed in serial as shown in FIG. 2(A). However, it is also possible to feed them in parallel as shown in FIG. 2(B) or successively with time intervals shorter than the duration of the pulse as shown in FIG. 2(C).

In these cases, it is necessary to feed the signals entering the parallel-serial conversion elements 61, 61', 61'' and 61''' (FIG. 4) into the AO drivers 5, 5', 5'' and 5''' either in parallel or in parallel-serial by the aid of the switches 62, 62', 62'' and 62'''.

As a result, several high frequency pulses are amplified in the AO drivers 63, 63', 63'' and 63''' in parallel. This type of system is more advantageous in the high speed scanning property though it requires larger electric capacities for AO drivers 5, 5', 5'' and 5'''.

EXAMPLE 3

In Examples 1 and 2 the laser beam was deflected in the vertical direction by use of ultrasonic waves having a plurality of different frequencies. However, it is also possible to realize the deflection by use of an ultrasonic wave of which frequency varies with time linearly.

A laser beam emitted from a laser oscillator 71 (FIG. 5) is divided into nearly identical two laser beams (or three or more) by the action of beam splitter 72. (The same effect is also obtained by use of a laser oscillator 71' in place of 72 and 73). The laser beam having passed through the beam splitter 72 is modulated in AO modulating element 74 by the latter pattern signal. Its beam diameter is expanded by beam expander 76, after which it enters AO deflecting element 77. Signal generator 79 generates an FM signal of which frequency $F_O$ changes by $\Delta F$ during a time period of $\tau + \tau_{107}$ as shown in FIG. 6(A). AO driver 78 amplifies this signal and feeds it into the AO deflecting element 77. Upon receiving the input from AO driver 78, there is formed in the AO deflecting element 77 a phase lattice of which the refractive index varies under ultrasonic wave and of which lattice pitch varies in proportion with the distance in the direction of the progress of the ultrasonic wave. By the action of the resulting phase lattice, the laser beam assumes a fan shape at one moment as if it were radiated from a given point in the plane including the progressing direction of the ultrasonic wave and the incidence direction of the laser. In FIG. 6(A), wherein the time when the ultrasonic wave passes through the path of laser beam (opening) is represented by $\tau$ and the time with which frequency of the ultrasonic wave varies linearly is represented by $\tau + \tau_{107}$, an ultrasonic wave of frequency $F_O$ reaches the opening at time $t_O$, and the opening is filled with the phase lattice produced by the ultrasonic wave at time $t_1 = t_O + \tau$ so that there is obtained a laser beam of fan shape as if it were radiated from point A in FIG. 6(C). As shown in FIG. 6(A), the frequency varies with time until at time $t_2$ the beam is deflected, for example, as if it were radiated from point B. As a result, the laser beam has been deflected by a quantity $\theta$ by the action of the FM signal which is repeated with a period of T as shown in FIG. 6(A). At this time, the signal of the first vertical line of the letter pattern (for example, the signal of its upper half) is fed into AO modulating element 74 (it may be an EO modulating element or the like) via the modulating driver 75 during the time period from $t_1$ to $t_2$ as shown in FiG. 6(B), whereby an exposure takes place. The signal may be either digital or analogue signal. By the above-mentioned procedure, one half of one vertical line of the letter pattern, for example 20 dots, can be recorded. (In FIG. 5 there are shown no means for scanning, image production and recording.)

The laser beam having been reflected on the beam splitter 72 is again reflected by the mirror 73 to enter AO modulating element 74'. Thereafter, it passes through beam expander 76' to enter AO deflecting element 77'. The FM signal shown in FIG. 6(A) passes through 79 and AO driver 78' to enter AO deflecting element 77' just in the same manner, where it is deflected similarly. The letter pattern signal entering the modulating driver 75' corresponds to, for example, the lower half of one vertical line pattern signal entering 75.

The laser beam thus modulated and deflected progresses via the mirror 83 to prisms 82 and 81 where two deflected beams are combined together and their paths are superposed so as to construct one vertical line of the letter pattern, in the same manner as in the preceding example.

If there were used only one AO deflecting element in the system of this embodiment, an elevation of $\Delta F$ in FIG. 6(A) with an aim to increase the number of resolution point would cause a reduction in the deflecting efficiency at the both terminals of $\Delta F$ (if the Bragg condition is satisified at the center of $\Delta F$), and an elevation of speed would bring about a low efficiency of the utilization of laser beam as compared with the case of FIG. 2(A); and the high speed recording performances would be injured at any rate. On the contrary, if a plurality of AO deflecting elements are used as have been mentioned in this example, the high speed recording performances are improved.

It is obvious from the above-mentioned examples that the process of the invention provides a Chinese character printer of high resolution power and high speed.

In the description given above, Japanese Patent Publication No. 23910/1967 corresponding to U.S. Pat. No. 3,666,363 was cited as a recording means. However, the process of the present invention is also applicable to other recording means by the utilization of laser induction including, for example, various electrophotographic methods, optical recording materials by use of silver or non-silver salts, recording means by utilization of a laser beam as heat energy, and so on.

The scanning procedure is not limited to to scanning in the vertical direction but it may be combined with disclosed deflecting means; that is, it may be combined with the transposition of recording material or a page-scanning may be effected by use of a series of Galvano mirrors while the recording material is fixed.

The process of the invention is also applicable to microphotography or supermicrophotography if the image producing lens is changed.

In the description given above, there were mentioned only the cases of horizontal writing. However, the process of the invention is also applicable to the cases of vertical writing. It is applicable to high resolution recording of not only Chinese characters but also Roman letters, numerals, marks and the like, such as photographic typing, preparation of color print negatives and particularly the preparation images formed by a network of dots.

What is claimed is:

1. An optical recording method for recording image information upon a recording medium, comprising the steps of:
   forming at least two light beams;
   projecting said light beams along first and second paths, respectively;
   dividing and simultaneously modulating each of said light beams to form respective first and second groups of modulated beams, wherein the beams of each said group are spaced along respective first and second imaginary straight lines, each of which projects through the beams of its associated group and is disposed substantially perpendicular to the directions of travel of the beams;
   directing each said group of beams through optical means for disposing such groups in a common array wherein the linearly spaced beams of each group are linearly spaced from the beams of the other group along a third substantially straight line projecting through each of said modulated beams and substantially perpendicular to their directions of travel; and
   scanning said recording medium with said array of modulated beams to form straight lines of image information on said recording medium in a direction substantially perpendicular to the scanning direction.

2. A method according to claim 1, wherein each of said light beams is divided into said respective first and second groups of light beams by an acoustic-optical deflecting element to which acoustic waves having different frequencies are applied in accordance with the number of divided beams.

3. A method according to claim 2, wherein said acoustic waves are successively applied to said acoustic-optical deflecting elements, respectively.

4. A method according to claim 2, wherein said acoustic waves are applied simultaneously to said acoustic-optical deflecting elements, respectively.

5. A method according to claim 1, wherein each of said light beams is divided into a group of nine beams.

6. A method according to claim 1, wherein said light beams are formed from a common light beam.

7. A method according to claim 1, wherein said light beams are laser beams.

8. A method according to claim 1, wherein said dividing and modulating step is performed by providing dividing and modulating means in each said beam path, and wherein said optical means includes prism means positioned along the path of the first group of beams and reflection means positioned along the path of the second group of beams.

9. A method according to claim 8, wherein, for each additional light beam, said optical means includes prism means and reflection means positioned along the path of its associated group of beams.

10. A method according to claim 9, wherein said directing step is performed by inclining at least one of said means associated with at least one of said light beams or group of beams with respect to said straight lines of image information.

11. A method according to claim 8, wherein said directing step is performed by inclining at least one of said means associated with at least one of said light beams or group of beams with respect to said straight lines of image information.

12. An optical recording method for recording image information upon a recording medium, comprising the steps of:
    forming at least two light beams;
    projecting said light beams along first and second paths, respectively;
    modulating each of said light beams;
    dividing each of said modulated light beams to form respective first and second groups of modulated beams, wherein the beams of each said group are spaced along responsive first and second imaginary straight lines, each of which projects through the beams of its associated group and is disposed substantially perpendicular to the directions of travel of the beams;
    directing each said group of beams through optical means for disposing such groups in a common array wherein the linearly spaced beams of each group are linearly spaced from the beams of the other group along a third substantially straight line projecting through each of said modulated beams and substantially perpendicular to their directions of travel; and
    scanning said recording medium with said array of modulated beams to form straight lines of image information on said recording medium in a direction substantially perpendicular to the scanning direction.

13. A method according to claim 12, wherein said plurality of light beams are laser beams.

14. A method according to claim 12, wherein said dividing and modulating step is performed by providing dividing and modulating means in each said beam path and wherein said optical means includes prism means positioned along the path of the first group of beams and reflection means positioned along the path of the second group of beams.

15. A method according to claim 14, wherein, for each additional light beam, said optical means includes prism means and reflection means at predetermined positions along the path of its associated group of beams.

16. A method according to claim 15, wherein said directing step is performed by inclining at least one of said means associated with at least one of said light beams or group of beams with respect to said straight lines of image information.

17. A method according to claim 14, wherein said directing step is performed by inclining at least one of said means associated with at least one of said light beams or group of beams with respect to said straight lines of image information.

* * * * *

UNITED STATES PATENT AND TRADEMARK OFFICE
CERTIFICATE OF CORRECTION

PATENT NO. : 4,053,898

DATED : October 11, 1977

INVENTOR(S) : KAZUHIRO HIRAYAMA ET AL

It is certified that error appears in the above-identified patent and that said Letters Patent are hereby corrected as shown below:

Column 1, line 49, insert --characters-- after "Chinese";

Column 1, line 56, "process" should read --processes--;

Column 2, line 55, "lattices" should read --lattice--;

Column 3, line 50, insert --such as-- before "a photosensitive";

Column 5, line 26, " 63,63',63" and 63''' " should read --5,5',5" and 5'''--;

Column 5, line 47, "$\tau + \tau_{107}$" should read --$\tau + \tau_\omega$--;

Column 5, line 63, "$\tau + \tau_{107}$" should read --$\tau + \tau_\omega$--;

Claim 12, column 8, line 21, "responsive" should read --respective--;

Claim 13, column 8, line 40, delete "plurality of".

Signed and Sealed this

Twenty-first Day of February 1978

[SEAL]

Attest:

RUTH C. MASON
Attesting Officer

LUTRELLE F. PARKER
Acting Commissioner of Patents and Trademarks